(12) United States Patent
Huang et al.

(10) Patent No.: US 11,769,081 B2
(45) Date of Patent: Sep. 26, 2023

(54) OPTIMUM SAMPLING SEARCH SYSTEM AND METHOD WITH RISK ASSESSMENT, AND GRAPHICAL USER INTERFACE

(71) Applicant: INDUSTRIAL TECHNOLOGY RESEARCH INSTITUTE, Hsinchu (TW)

(72) Inventors: Po-Yu Huang, Zhudong Township (TW); Yu-Hsiuan Chang, New Taipei (TW); Hong-Chi Ku, Xihu Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 923 days.

(21) Appl. No.: 16/728,759

(22) Filed: Dec. 27, 2019

(65) Prior Publication Data
US 2021/0174261 A1 Jun. 10, 2021

(30) Foreign Application Priority Data

Dec. 6, 2019 (TW) .................................. 108144692

(51) Int. Cl.
| | | |
|---|---|---|
| *G06N 20/10* | (2019.01) | |
| *G06F 17/18* | (2006.01) | |
| *G06N 5/045* | (2023.01) | |
| *G06Q 10/0635* | (2023.01) | |
| *G06N 5/01* | (2023.01) | |

(52) U.S. Cl.
CPC ............. *G06N 20/10* (2019.01); *G06F 17/18* (2013.01); *G06N 5/01* (2023.01); *G06N 5/045* (2013.01); *G06Q 10/0635* (2013.01)

(58) Field of Classification Search
None
See application file for complete search history.

(56) References Cited

U.S. PATENT DOCUMENTS 7,277,832 B2   10/2007  Chiang
7,698,246 B2    4/2010  Friedlander et al.
(Continued)

FOREIGN PATENT DOCUMENTS

CN        104199870 A    12/2014
CN        106897566 A     6/2017
(Continued)

OTHER PUBLICATIONS

Chen et al., A hierarchical expected improvement method for Bayesian optimization, arXiv:1911.07285v1 [stat. ME] Nov. 17, 2019; Total pp. 30 (Year: 2019).*
(Continued)

*Primary Examiner* — Alan Chen
(74) *Attorney, Agent, or Firm* — Birch, Stewart, Kolasch & Birch, LLP (57) ABSTRACT

An optimum sampling search system and method with risk assessment, and a graphical user interface are provided. The optimum sampling search system includes a data acquisition unit, an objective satisfaction score calculation unit, a constraint satisfaction probability calculation unit, a sampling risk evaluation unit, and an adjusting unit. If the constraint satisfaction probability of a recommended sampling parameter is between a first predetermined value and a second predetermined value, the recommended sampling parameter is adjusted, by the adjusting unit, to optimize a constraint satisfaction probability model.

18 Claims, 10 Drawing Sheets

(56) References Cited

U.S. PATENT DOCUMENTS

| | | | |
|---|---|---|---|
| 8,688,616 | B2 | 4/2014 | Martinez |
| 10,317,857 | B2 | 6/2019 | Kolinsky et al. |
| 2008/0289875 | A1 | 11/2008 | Burge et al. |
| 2013/0110751 | A1 | 5/2013 | Sheta et al. |
| 2013/0238533 | A1 | 9/2013 | Virkar et al. |
| 2017/0169353 | A1 | 6/2017 | Thompson |
| 2018/0285516 | A1 | 10/2018 | Shah |
| 2019/0026290 | A1 | 1/2019 | Huang et al. |
| 2020/0167691 | A1* | 5/2020 | Golovin ............... G06N 3/08 |
| 2021/0210214 | A1* | 7/2021 | Hampshire .......... A61B 5/4088 |

FOREIGN PATENT DOCUMENTS

| | | |
|---|---|---|
| CN | 107341279 A | 11/2017 |
| CN | 110348615 A | 10/2019 |
| EP | 1 789 651 A1 | 5/2007 |
| JP | 201812646 A | 4/2018 |
| JP | 2019-192160 A | 10/2019 |
| TW | I261763 B | 9/2006 |
| TW | I625682 B | 6/2018 |
| WO | WO 2018/222205 A1 | 12/2018 |

OTHER PUBLICATIONS

Taiwanese Office Action and Search Report, dated Mar. 12, 2021, for Taiwanese Application No. 108144692.
Chinese Notice of Allowance for Chinese Application No. 202010116772.7, dated Oct. 21, 2022.
Gardner et al., "Bayesian Optimization with Inequality Constraints", Proceedings of the 31st International Conference on Machine Learning (ICML), 2014, pp. 1-9.

* cited by examiner

OPTIMUM SAMPLING SEARCH SYSTEM AND METHOD WITH RISK ASSESSMENT, AND GRAPHICAL USER INTERFACE

This application claims the benefit of Taiwan application Serial No. 108144692, filed Dec. 6, 2019, the disclosure of which is incorporated by reference herein in its entirety.

TECHNICAL FIELD

The disclosure relates in general to an optimum sampling search system, an optimum sampling search method and a graphical user interface.

BACKGROUND

In the optimization search technology of many industries, it is usually necessary to meet certain constraints to obtain the sampling parameters that can obtain the best objective function outputting value. Taking the thin film process as an example, the researchers must find a set of process parameters, such as RF energy, the amount of SiH4 and the amount of NH3, so that the film thickness is within a certain specification and the stress is minimized. Taking the chemical process as an example, the researchers must find a set of operating parameters, such as the amount of chemicals added, the cooling water control conditions and the circulating reflux ratio, so that the reaction temperature is within certain limited safety conditions and the product yield is maximized.

In these application scenarios, the objective function and the constraint function are unknown black-boxes. Before the experiment, it is impossible to know whether the objective function outputting value is optimal and whether the constraint function outputting value meets the constraint.

At present, the conventional optimization search method is easy to confuse the effects of the objective function and the constraint function, and extract too many sampling points that do not meet the constraint, causing problems such as poor search parameter efficiency. Therefore, how to improve the search efficiency of the optimum sampling parameter is one of the research efforts of the researchers.

SUMMARY

The disclosure is directed to an optimum sampling search system, an optimum sampling search method and a graphical user interface.

According to one embodiment, an optimum sampling search system with risk estimation is provided. The optimum sampling search system includes a data acquisition unit, an objective satisfaction score calculation unit, a constraint satisfaction probability calculation unit, a sampling risk evaluation unit and an adjusting unit. The data acquisition unit is used for obtaining at least one objective function outputting value and at least one constraint function outputting value according to at least one executed sampling parameter. The objective satisfaction score calculation unit is used for obtaining an objective satisfaction score model according to the at least one executed sampling parameter and the at least one objective function outputting value. The constraint satisfaction probability calculation unit is used for obtaining a constraint satisfaction probability model according to the at least one sampling parameter and the at least one constraint function outputting value. The sampling risk evaluation unit is used for obtaining a recommended sampling parameter according to the objective satisfaction score model and used for estimating a constraint satisfaction probability of the recommended sampling parameter according to the recommended sampling parameter and the constraint satisfaction probability model. If the constraint satisfaction probability of the recommended sampling parameter is larger than or equal to a first predetermined value, the recommended sampling parameter is outputted. If the constraint satisfaction probability of the recommended sampling parameter is between the first predetermined value and a second predetermined value, the adjusting unit adjusts the recommended sampling parameter to optimize the constraint satisfaction probability model.

According to another embodiment, an optimum sampling search method with risk estimation is provided. The optimum sampling search method includes the following steps. At least one objective function outputting value and at least one constraint function outputting value are obtained according to at least one executed sampling parameter. An objective satisfaction score model is obtained according to the at least one executed sampling parameter and the at least one objective function outputting value. A constraint satisfaction probability model is obtained according to the at least one sampling parameter and the at least one constraint function outputting value. A recommended sampling parameter is obtained according to the objective satisfaction score model. A constraint satisfaction probability of the recommended sampling parameter is estimated according to the recommended sampling parameter and the constraint satisfaction probability model. The recommended sampling parameter is outputted, if the constraint satisfaction probability of the recommended sampling parameter is larger than or equal to a first predetermined value. The recommended sampling parameter is adjusted to optimize the constraint satisfaction probability model, if the constraint satisfaction probability of the recommended sampling parameter is between the first predetermined value and a second predetermined value.

According to an alternative embodiment, a graphical user interface is provided. The graphical user interface includes an objective satisfaction score model window, a constraint satisfaction probability model window and a sampling information window. The objective satisfaction score model window is used for displaying an objective satisfaction score model. The objective satisfaction score model is obtained according to at least one executed sampling parameter and at least one objective function outputting value. The constraint satisfaction probability model window is used for displaying a constraint satisfaction probability model. The constraint satisfaction probability model is obtained according the at least one executed sampling parameter and at least one constraint function outputting value. The sampling information window is used for displaying a recommended sampling parameter and a constraint satisfaction probability. The recommended sampling parameter is obtained according to the objective satisfaction score model, and the constraint satisfaction probability is obtained according to the recommended sampling parameter and the constraint satisfaction probability model.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
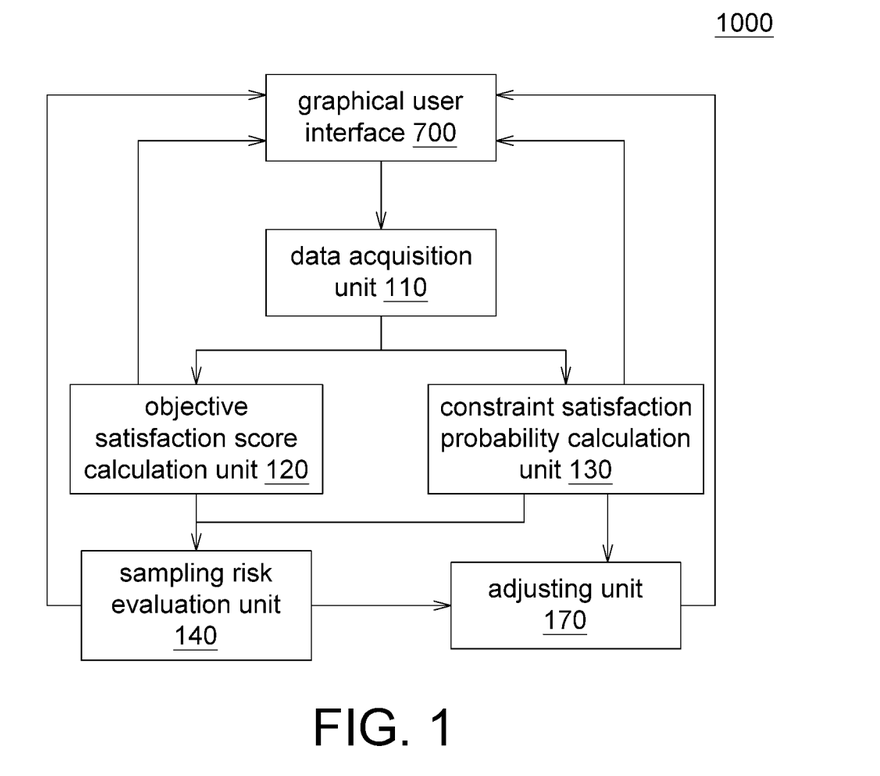
FIG. 1 shows an optimum sampling search system with risk estimation according to one embodiment.

Please refer to FIG. 1, which shows an optimum sampling search system 1000 with risk estimation according to one embodiment. The optimum sampling search system 1000 includes a data acquisition unit 110, an objective satisfaction score calculation unit 120, a constraint satisfaction probability calculation unit 130, a sampling risk evaluation unit 140, an adjusting unit 170 and a graphical user interface 700. The data acquisition unit 110 may be a data acquisition card interface, a transmission line, a card reader, a wireless transmission module or a scanner. Each of the objective satisfaction score calculation unit 120, the constraint satisfaction probability calculation unit 130, the sampling risk evaluation unit 140 and the adjusting unit 170 may be a circuit, a chip, a circuit board, a plurality of program codes and a storage storing the program codes. The graphical user interface 700 may be a tablet, a mobile phone, a computer, or a head-mounted display.

During searching the optimum sampling parameter, the optimum sampling search system 1000 combines the risk assessment mechanism and the probability model optimization technology to improve the search performance of sampling parameters, so as to achieve the industrial application requirements of reducing the number of trials and shortening the adjusting time. The operation of those elements is illustrated via a flowchart.

Figure 2:
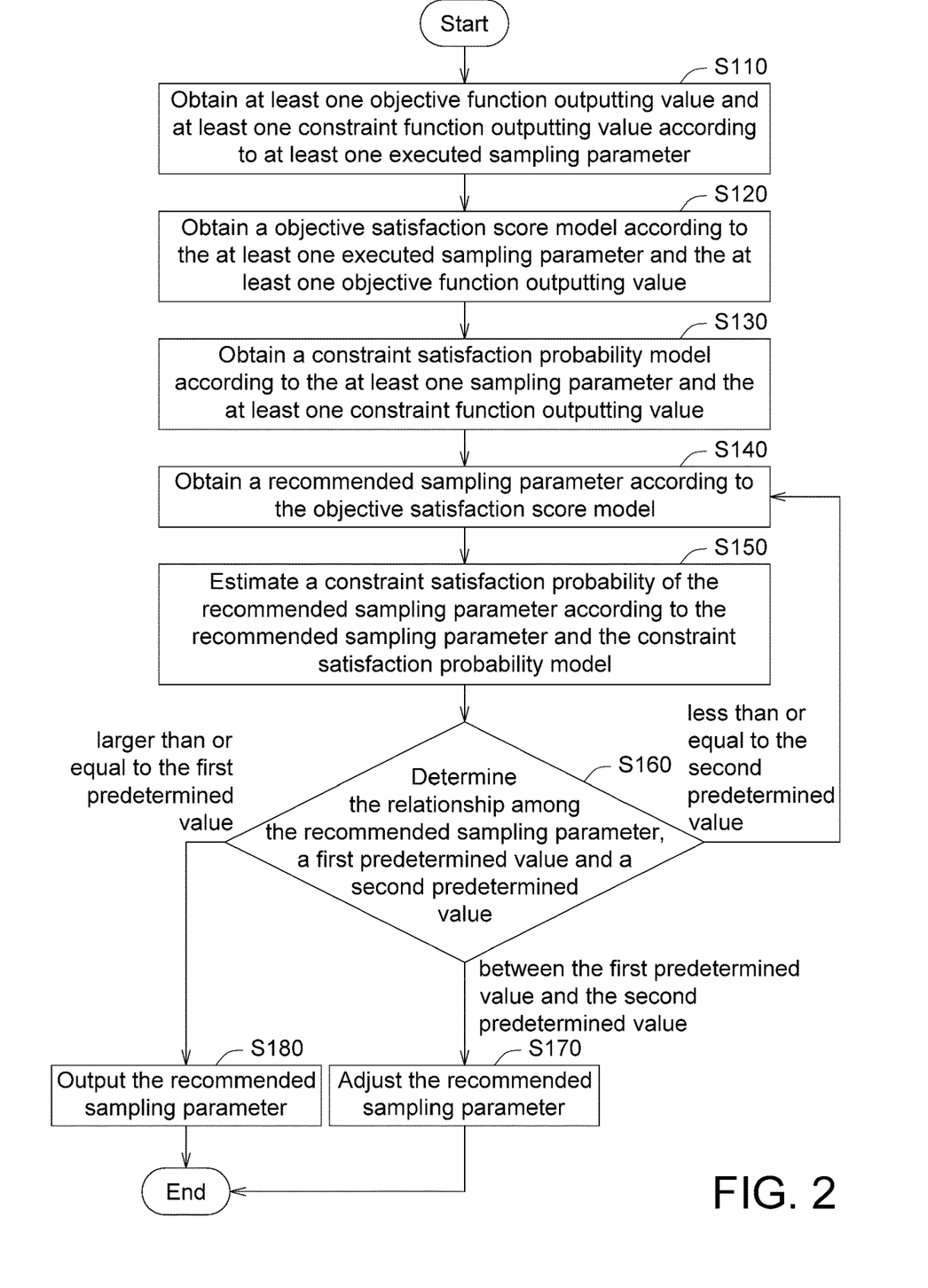
FIG. 2 shows a flowchart of an optimum sampling search method with risk estimation according to one embodiment.
Figure 3:
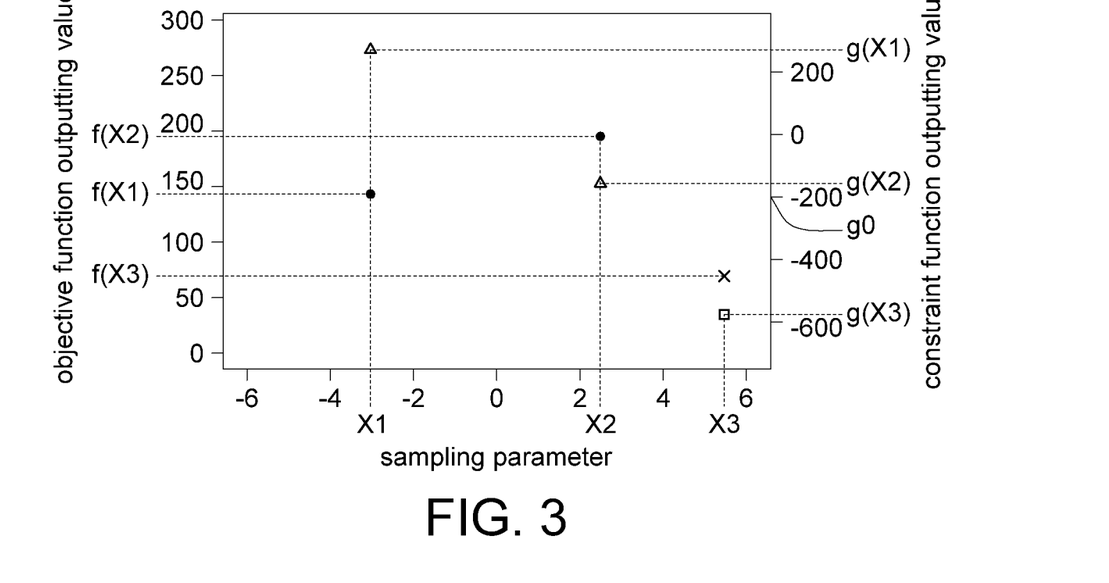
FIGS. 3 to 12 illustrate the steps in the FIG. 2.

Please refer to FIGS. 2 to 12. FIG. 2 shows a flowchart of an optimum sampling search method with risk estimation according to one embodiment, and FIGS. 3 to 12 illustrate the steps in the FIG. 2. In the step S110, the data acquisition unit 110 obtains at least one objective function outputting value (e.g., objective function outputting values f(X1), f(X2), f(X3) in the FIG. 3) and at least one constraint function outputting value (e.g., constraint function outputting values g(X1), g(X2), g(X3) in the FIG. 3) according to at least one executed sampling parameter (e.g., sampling parameters X1, X2, X3 in the FIG. 3). The objective function outputting values f(X1), f(X2), f(X3) may be the error values. The lower the error value, the better. The constraint function outputting values g(X1), g(X2), g(X3) may be the changes of the film thickness. The change of the film thickness must higher than a condition value g0.

TABLE I

| sampling parameter | objective function outputting value | constraint function outputting value (condition value g0 = −200) |
|---|---|---|
| X1 = −3 | f(X1) = 143.9 | g(X1) = 230 |
| X2 = 2.5 | f(X2) = 195.1 | g(X2) = −190 |
| X3 = 5.5 | f(X3) = 68.6 | g(X3) = −420 |

Figure 4:
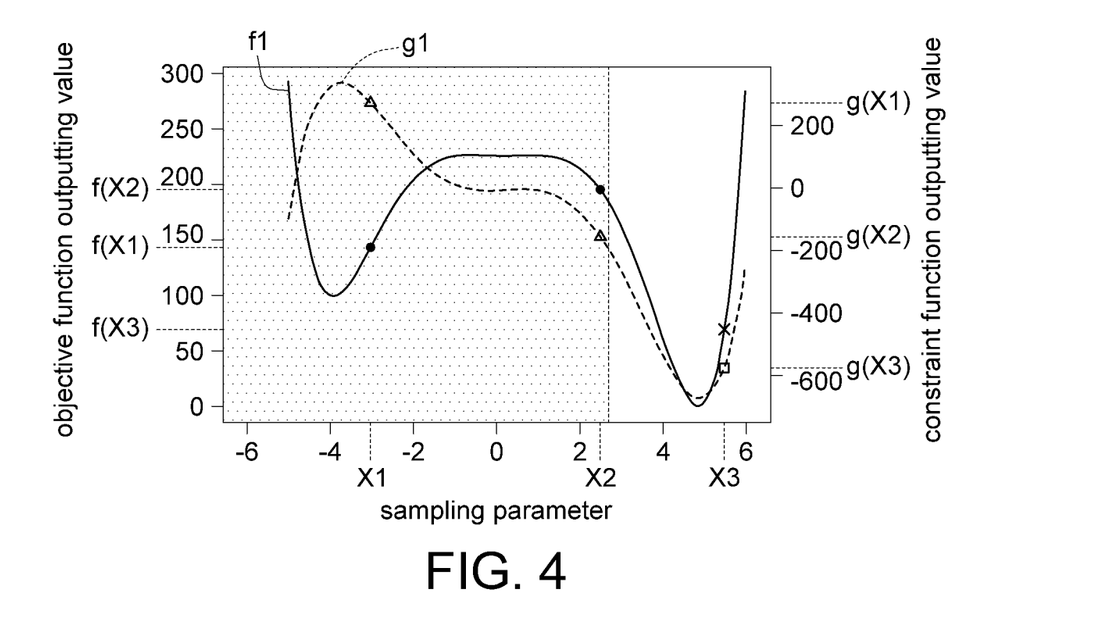

As shown in the FIG. 4 and the table I, for these three sampling parameters X1, X2, X3, the objective function outputting value f(X3) is the lowest, but the constraint function outputting value g(X3) is lower than the condition value g0, so the sampling parameter X3 is not the optimum. The objective function outputting value f(X1) is lower than the objective function outputting value f(X2), and the constraint function outputting value g(X1) is higher than the condition value g0, so the sampling parameter X1 is the optimum among the sampling parameters X1, X2, X3.

Only the sampling parameters X1, X2, X3 have been obtained so far.

Researchers must further search for better sampling parameters. The following steps can be used to modify the model to search for better sampling parameters.

Next, in the step S120, the objective satisfaction score calculation unit 120 obtains an objective satisfaction score model (e.g., an objective satisfaction score model E1) according to the executed sampling parameter (e.g., the sampling parameters X1, X2, X3) and the objective function outputting value (e.g., the objective function outputting values f(X1), f(X2), f(X3)). As shown in the FIG. 4, the sampling parameters X1, X2, X3 are inputted into the unknown objective function to obtain the objective function outputting values f(X1), f(X2), f(X3). The unknown objective function may be the curve f1 in the FIG. 4. For the unknown objective function, the sampling parameters X1, X2, X3 correspond to the explicit objective function outputting values f(X1), f(X2), f(X3), but the remaining sampling parameters correspond to inexplicit objective function outputting values. The objective satisfaction score calculation unit 120 obtains the objective satisfaction score model E1 via a Gaussian process (GP) and an Expected Improvement acquisition function (EI acquisition function). In the objective satisfaction score model E1, it references to the locations of the sampling parameters X1, X2, X3 and the objective function outputting values f(X1), f(X2), f(X3), to show an objective satisfaction score of each of the sampling parameters. The higher the objective satisfaction score, the better able to satisfy the objective function, such as low error value; the lower the objective satisfaction score, the less likely to satisfy the objective function, such as high error value. Therefore, when selecting the sampling parameter, it can be selected from the higher objective satisfaction score.

Then, in step S130, the constraint satisfaction probability calculation unit 130 obtains a constraint satisfaction probability model (e.g., a constraint satisfaction probability model P1) according to the executed sampling parameter (e.g., the sampling parameters X1, X2, X3) and the constraint function outputting value (e.g., the constraint function outputting values g(X1), g(X2), g(X3)).

As shown in the FIG. 4, the sampling parameters X1, X2, X3 are inputted into the unknown constraint function to obtain the constraint function outputting values g(X1), g(X2), g(X3). The unknown constraint function may be a curve g1 in the FIG. 4. For the unknown constraint function, the sampling parameters X1, X2, X3 correspond to the explicit constraint function outputting values g(X1), g(X2), g(X3), but the remaining sampling parameters correspond to inexplicit constraint function outputting values. The constraint satisfaction probability calculation unit 130 obtains the constraint satisfaction probability model P1 in the FIG. 6 via a Support Vector Machine (SVM) algorithm. For example, the SVM algorithm may be a one class SVM algorithm or a Multi-class SVM algorithm.

Figure 6:
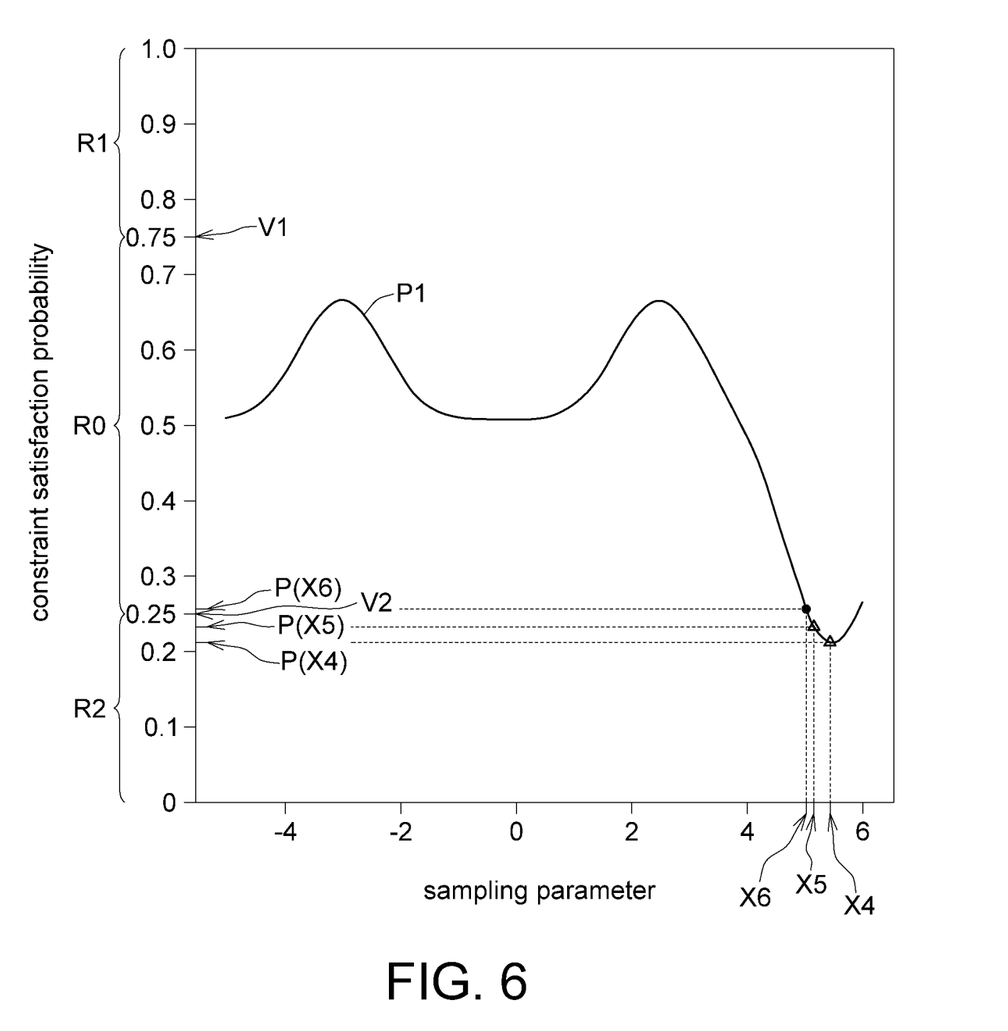

As shown in the FIG. 6, the constraint satisfaction probability of the constraint satisfaction probability model P1 is from 0 to 1. The lower the value, the lower the constraint satisfaction probability; the higher the value, the higher the constraint satisfaction probability. The constraint satisfaction probability can be divided into a possible satisfy region R1, an uncertain region R0 and an impossible satisfy region R2. If the constraint satisfaction probability is within the possible satisfy region R1, the probability that this sampling parameter satisfies the unknown constraint function is quite high; if the constraint satisfaction probability is within the impossible satisfy region R2, the probability that this sampling parameter satisfies the unknown constraint function is quite low; if the constraint satisfaction probability is within the uncertain region R0, the probability that this sampling parameter meets the unknown constraint function is uncertain.

Figure 7:
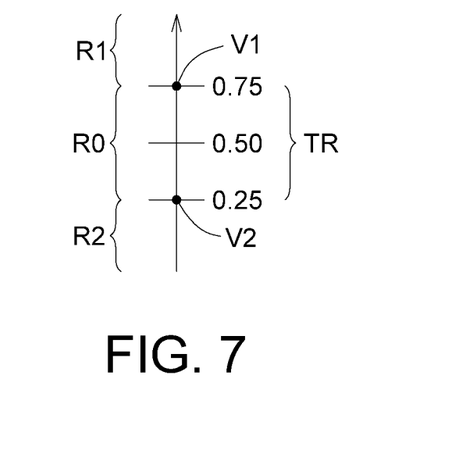

A first predetermined value V1 and a second predetermined value V2 are used to divide the constraint satisfaction probability into the possible satisfy region R1, the uncertain region R0 and the impossible satisfy region R2. The first predetermined value V1 and the second predetermined value V2 can be set according to a tolerance TR (shown in the FIG. 7). Please refer to the FIG. 7, which shows that the first predetermined value V1 and the second predetermined value V2 are set according to the tolerance TR. The sampling risk evaluation unit 140 set the first predetermined value V1 and the second predetermined value V2 via a discretization algorithm according to the tolerance TR. A difference between the first predetermined value V1 and the second predetermined value V2 is the tolerance TR. For example, the first predetermined value V1 and the second predetermined value V2 may be calculated according to the following equations (1), (2).

$$V1 = 1 - 0.5*(1-TR) \quad (1)$$

$$V2 = 0.5*(1-TR) \quad (2)$$

If the constraint satisfaction probability is larger than or equal to the first predetermined value V1, it is within the possible satisfy region R1; if the constraint satisfaction probability is between the first predetermined value V1 and the second predetermined value V2, it is within the uncertain region R0; if the constraint satisfaction probability is less than or equal to the second predetermined value V2, it is within the impossible satisfy region R2.

Figure 8:
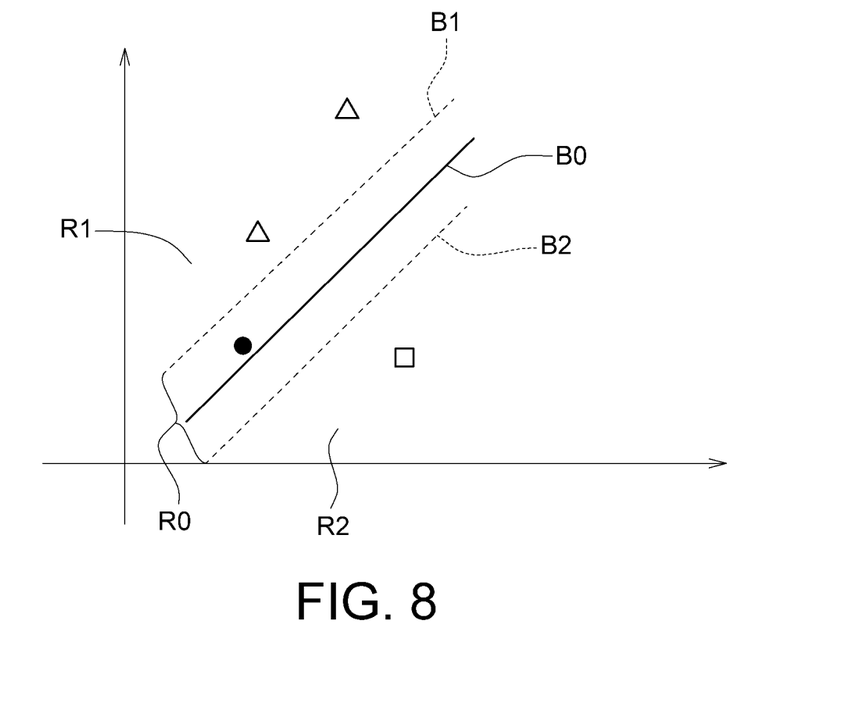

Please refer to the FIG. 8, which illustrates the SVM algorithm according to one embodiment. In the SVM algorithm, a decision boundary B0 whose value is 0.5 is used to classify the possible satisfy region R1 and the impossible satisfy region R2. Some points which are not be explicitly classified into the two groups are within the uncertain region R0, i.e. the region between the dotted line B1 and the dotted line B2. The constraint satisfaction probability model P1 can be modified as the amount of data increases, such that the dotted lines B1, B2 gradually approach and the uncertain region R0 is narrowed. Generally speaking, when the next sampling parameter is close to the decision boundary B0, the uncertain region R0 can be quickly narrowed.

With the objective satisfaction score model E1 and the constraint satisfaction probability model P1, a recommended sampling parameter will have the following six situations in Table II.

TABLE II

| | | objective satisfaction score model E1 | |
|---|---|---|---|
| | | High score | Low score |
| constraint satisfaction probability model P1 | possible satisfy region R1 | Output the recommended sampling parameter | Do not output the recommended sampling parameter |
| | uncertain region R0 | Adjust the recommended sampling parameter to optimize the constraint satisfaction probability model | Do not output the recommended sampling parameter |
| | impossible satisfy region R2 | Do not output the recommended sampling parameter | Do not output the recommended sampling parameter |

In the step S140 of the FIG. 2, the sampling risk evaluation unit 140 obtains the recommended sampling parameter according to the objective satisfaction score model E1. As shown in Table II, the sampling risk evaluation unit 140 will not output the sampling parameter whose objective satisfaction score is low. As shown in the FIG. 5, the sampling risk evaluation unit 140 selects a sampling parameter X4 whose objective satisfaction score E(X4) is highest.

In the step S150 of the FIG. 2, the sampling risk evaluation unit 140 estimates a constraint satisfaction probability (e.g., a constraint satisfaction probability P(X4) in the FIG. 6) according to the recommended sampling parameter (e.g., the sampling parameter X4) and the constraint satisfaction probability model (e.g., the constraint satisfaction probability model P1). As shown in the FIG. 6 and the table III, the constraint satisfaction probability P(X4) of the sampling parameter X4 is 0.21.

TABLE III

| sampling parameter | objective function outputting value | constraint function outputting value (condition value g0 = −200) | objective satisfaction score | constraint satisfaction probability |
|---|---|---|---|---|
| X1 = −3 | f(X1) = 143.9 | g(X1) = 230 | | |
| X2 = 2.5 | f(X2) = 195.1 | g(X2) = −190 | | |
| X3 = 5.5 | f(X3) = 68.6 | g(X3) = −420 | | |
| X4 = 5.45 | | | E(X4) = 80 | P(X4) = 0.21 |

Next, in the step S160, the sampling risk evaluation unit 140 determines the relationship among the constraint satisfaction probability of the recommended sampling parameter (e.g., the constraint satisfaction probability P(X4) of the sampling parameter X4), the first predetermined value V1 and the second predetermined value V2. In this case, the constraint satisfaction probability P(X4) of the sampling parameter X4 is less than the second predetermined value V2, and within the impossible satisfy region R2. As shown in the table II, the sampling risk evaluation unit 140 will not output the sampling parameter X4. So, the process backs to the step S140 to get another recommended sampling parameter.

Figure 5:
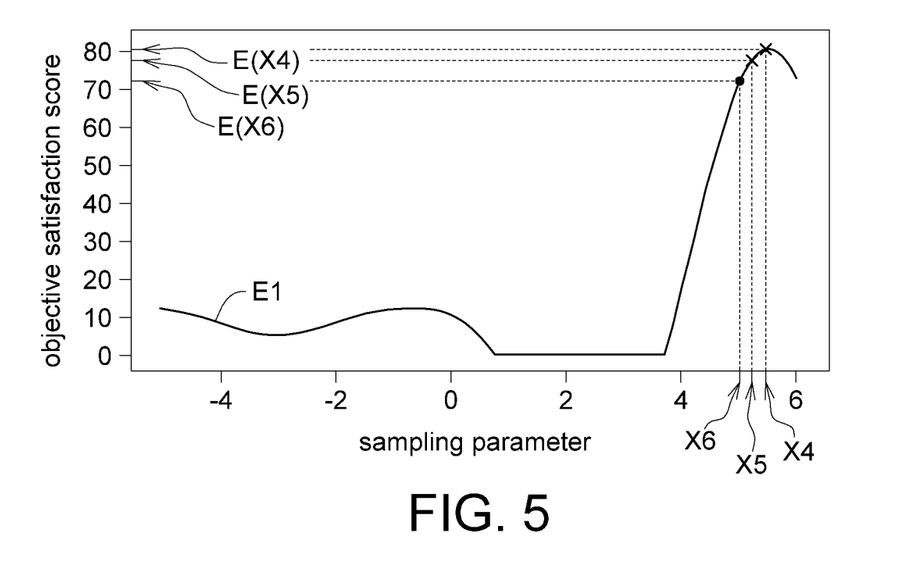

As shown in the FIG. 5, the sampling risk evaluation unit 140 obtains the next recommended sampling parameter (e.g., the sampling parameter X5 in the FIG. 5) according to the objective satisfaction score model E1. Further, in the step S150 of the FIG. 2, the sampling risk evaluation unit 140 estimates the constraint satisfaction probability (e.g., the constraint satisfaction probability P(X5)) according to the recommended sampling parameter (e.g., the sampling parameter X5) and the constraint satisfaction probability model P1. As shown in the FIG. 6 and the table IV, the constraint satisfaction probability P(X5) of the sampling parameter X5 is 0.225.

TABLE IV

| sampling parameter | objective function outputting value | constraint function outputting value (condition value g0 = −200) | objective satisfaction score | constraint satisfaction probability |
|---|---|---|---|---|
| X1 = −3 | f(X1) = 143.9 | g(X1) = 230 | | |
| X2 = 2.5 | f(X2) = 195.1 | g(X2) = −190 | | |
| X3 = 5.5 | f(X3) = 68.6 | g(X3) = −420 | | |
| X4 = 5.45 | | | E(X4) = 80 | P(X4) = 0.21 |
| X5 = 5.05 | | | E(X5) = 75 | P(X5) = 0.225 |

Next, in the step S160, the sampling risk evaluation unit 140 determines the relationship among the constraint satisfaction probability of the recommended sampling parameter (e.g., the constraint satisfaction probability P(X5) of the sampling parameter X5), the first predetermined value V1 and the second predetermined value V2. In this case, the constraint satisfaction probability P(X5) of the sampling parameter X5 is still less than the second predetermined value V2, and within the impossible satisfy region R2. According to the table II, the sampling risk evaluation unit 140 will not output the sampling parameter X5. So, the process backs to the step S140 to get another recommended sampling parameter.

As shown in the FIG. 5, the sampling risk evaluation unit 140 obtains the next recommended sampling parameter (e.g., the sampling parameter X6 in the FIG. 5) according to the objective satisfaction score model E1. Further, in the step S150 of the FIG. 2, the sampling risk evaluation unit 140 estimates the constraint satisfaction probability (e.g., the constraint satisfaction probability P(X6)) according to the recommended sampling parameter (e.g., the sampling parameter X6) and the constraint satisfaction probability model P1. As shown in the FIG. 6 and the table V, the constraint satisfaction probability P(X6) of the sampling parameter X6 is 0.251.

TABLE V

| sampling parameter | objective function outputting value | constraint function outputting value (condition value g0 = −200) | objective satisfaction score | constraint satisfaction probability |
|---|---|---|---|---|
| X1 = −3 | f(X1) = 143.9 | g(X1) = 230 | | |
| X2 = 2.5 | f(X2) = 195.1 | g(X2) = −190 | | |
| X3 = 5.5 | f(X3) = 68.6 | g(X3) = −420 | | |
| X4 = 5.45 | | | E(X4) = 80 | P(X4) = 0.21 |
| X5 = 5.05 | | | E(X5) = 75 | P(X5) = 0.225 |
| X6 = 4.9 | | | E(X6) = 72 | P(X6) = 0.251 |

Then, in the step S160, the sampling risk evaluation unit 140 determines the relationship among the constraint satisfaction probability of the recommended sampling parameter (e.g., the constraint satisfaction probability P(X6) of the sampling parameter X6), the first predetermined value V1 and the second predetermined value V2. In this case, the constraint satisfaction probability P(X6) of the sampling parameter X6 is between the first predetermined value V1 and the second predetermined value V2, and within the uncertain region R0. According to the table II, the constraint satisfaction probability model P1 is needed to be adjusted, so the process proceeds to the step S170.

In the step S170, the adjusting unit 170 adjusts the sampling parameter, to optimize the constraint satisfaction probability model P1. In one embodiment, as shown in the FIG. 9, the adjusting unit 170 obtains the next recommended sampling parameter via an Active Learning algorithm with uncertainty sampling. For example, a sampling parameter X7 which is close to the decision boundary B0 is selected to optimize the constraint satisfaction probability model P1 and narrow the uncertain region R0. As shown in the FIG. 9 and the table VI, the constraint satisfaction probability P(X7) of the sampling parameter X7 is 0.51, which is close to the decision boundary B0.

TABLE VI

| sampling parameter | objective function outputting value | constraint function outputting value (condition value g0 = −200) | objective satisfaction score | constraint satisfaction probability |
|---|---|---|---|---|
| X1 = −3 | f(X1) = 143.9 | g(X1) = 230 | | |
| X2 = 2.5 | f(X2) = 195.1 | g(X2) = −190 | | |
| X3 = 5.5 | f(X3) = 68.6 | g(X3) = −420 | | |
| X4 = 5.45 | | | E(X4) = 80 | P(X4) = 0.21 |
| X5 = 5.05 | | | E(X5) = 75 | P(X5) = 0.225 |
| X6 = 4.9 | | | E(X6) = 72 | P(X6) = 0.251 |
| X7 = 3.9 | f(X7) = 73.9 | g(X7) = −550 | | P(X7) = 0.51 |

Figure 10:
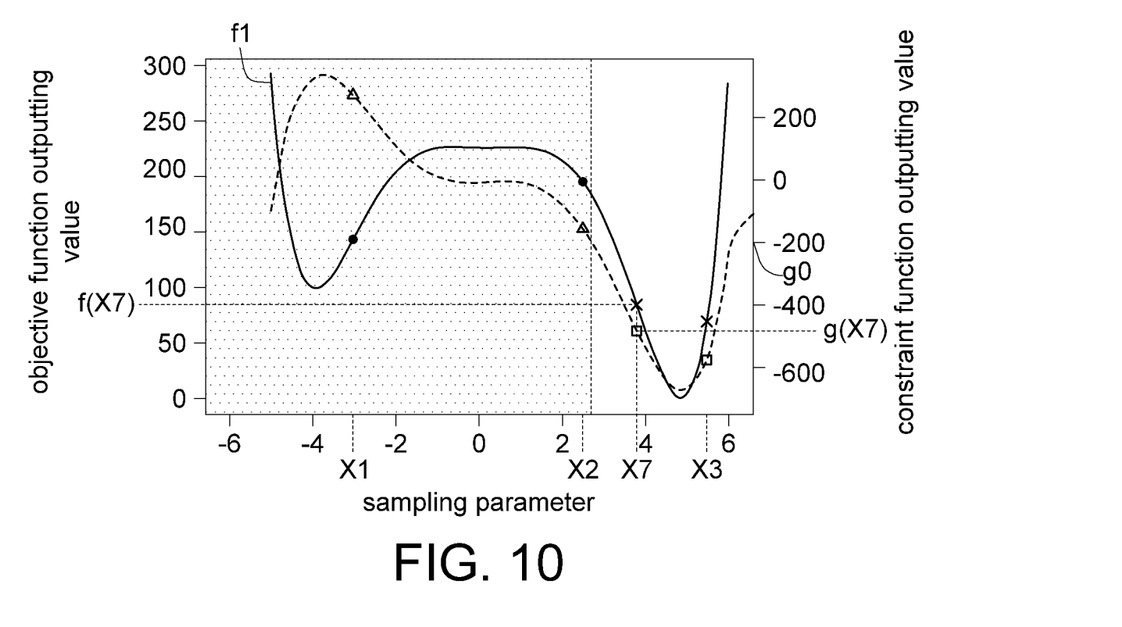

After obtaining the sampling parameter X7, the user can execute the sampling parameter X7. When performing this process again, in the step S110, as shown in the FIG. 10, the data acquisition unit 110 obtains the objective function outputting value (e.g., the objective function outputting values f(X1), f(X2), f(X3), f(X7)) and the constraint function outputting value (e.g., the constraint function outputting values g(X1), g(X2), g(X3), g(X7)) according to the executed sampling parameter (e.g., the sampling parameters X1, X2, X3, X7). As shown in the table VI, the four sampling parameters X1, X2, X3, X7, the objective function outputting values f(X1), f(X2), f(X3), f(X7) and the constraint function outputting values g(X1), g(X2), g(X3), g(X7) are obtained.

Figure 11:
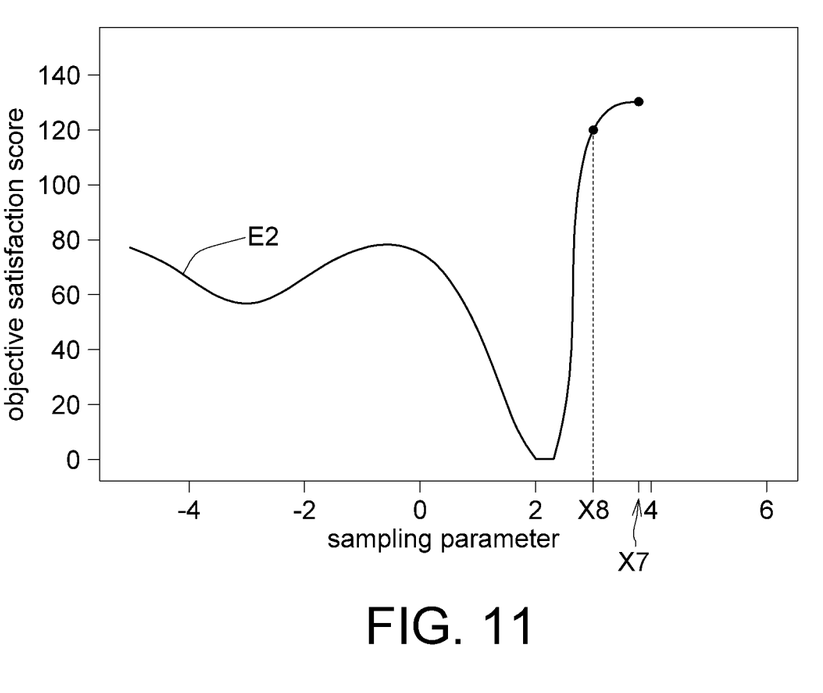

Afterwards, in the step S120, the objective satisfaction score calculation unit 120 obtains an objective satisfaction score model E2 of the FIG. 11 via the GP and the EI acquisition function. In the objective satisfaction score model E2, it references the location of the sampling parameters X1, X2, X3, X7 and the objective function outputting values f(X1), f(X2), f(X3), f(X7) to show an objective satisfaction score of each of the sampling parameters. Comparing with the objective satisfaction score model E1, the objective satisfaction score model E2 is more accurate.

Figure 9:
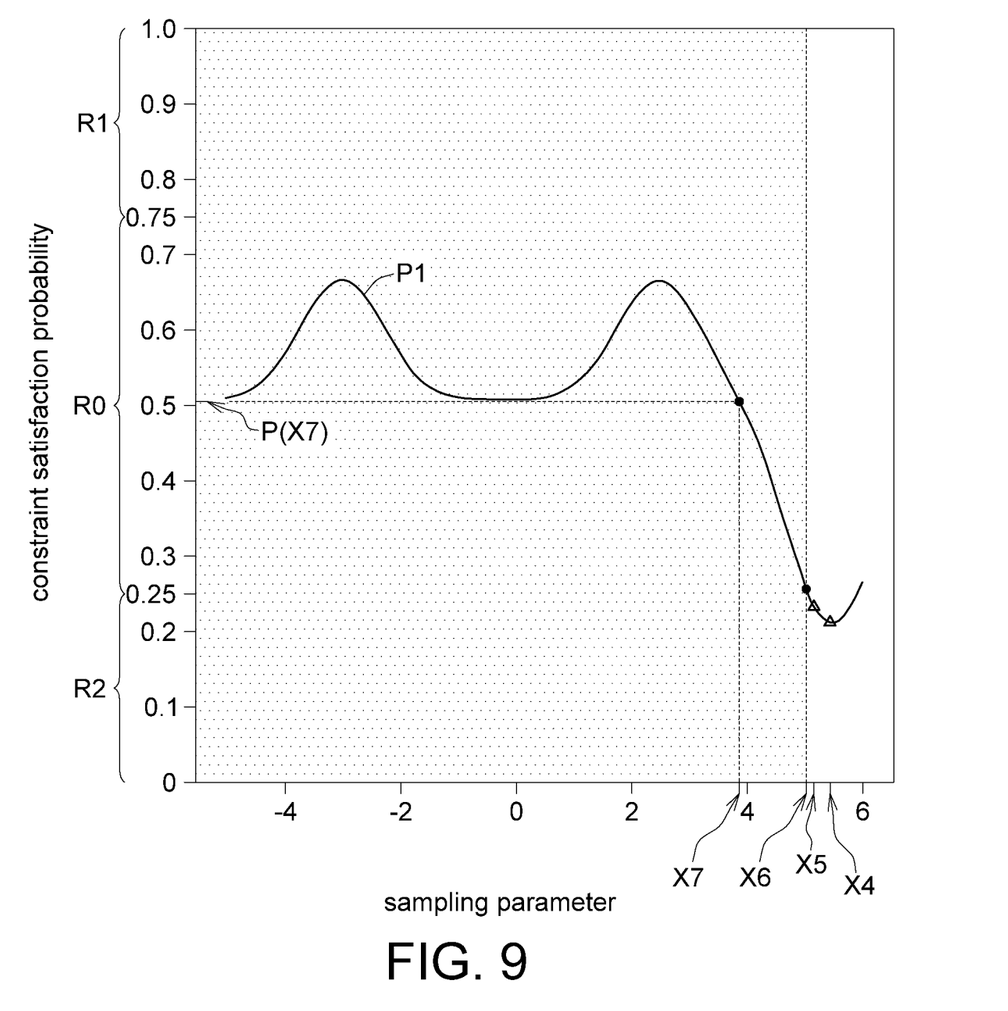
Figure 12:
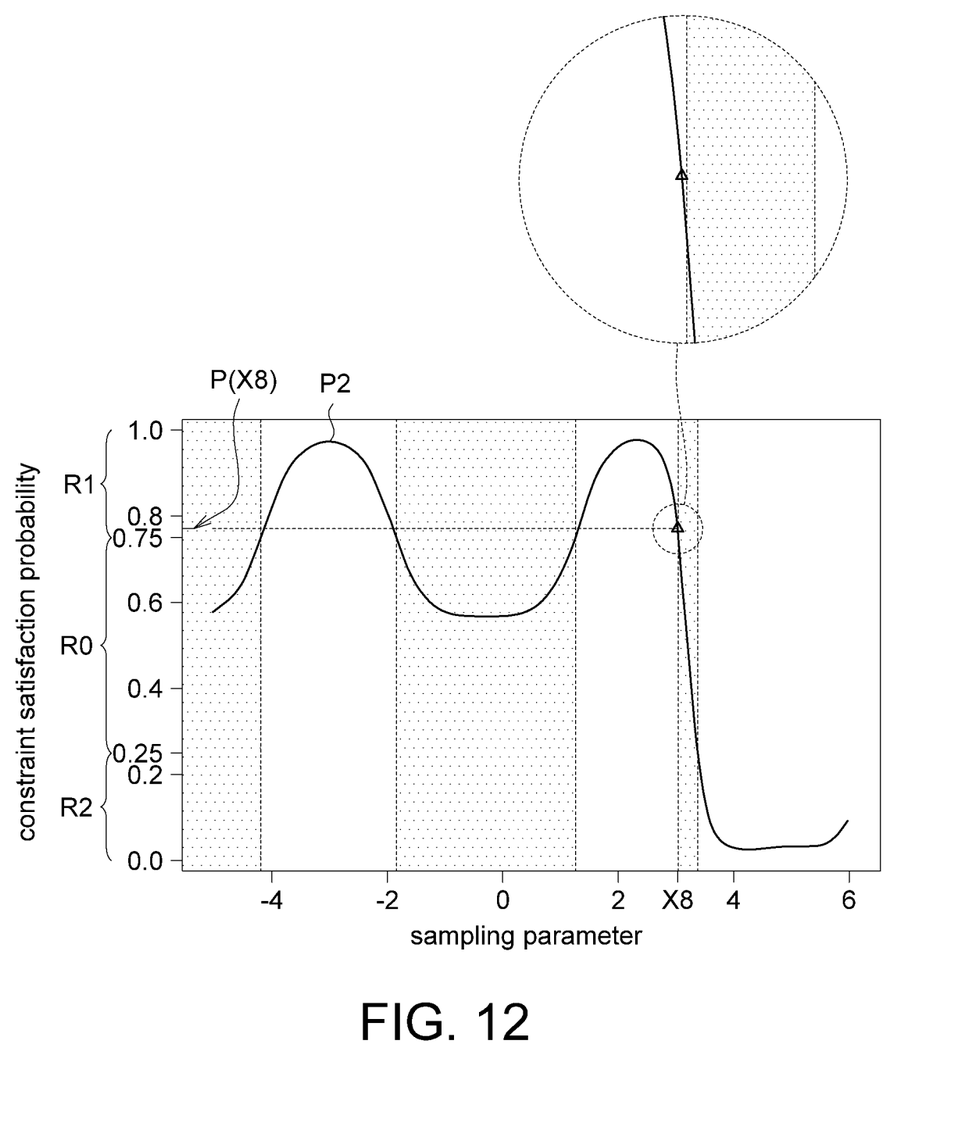

Then, in the step S130, the constraint satisfaction probability calculation unit 130 obtains a constraint satisfaction probability model P2 according to the executed sampling parameters (e.g., the sampling parameters X1, X2, X3, X7) and the constraint function outputting values (e.g., the constraint function outputting values g(X1), g(X2), g(X3), g(X7)). As shown in the FIG. 12, the sampling parameter X7 is close to the decision boundary B0, so the uncertain region R0 in the constraint satisfaction probability model P2 may be quickly narrowed. As shown in FIGS. 9 and 12, the dotted pattern shows the uncertainty region R0. It is clear that the uncertain region R0 in the constraint satisfaction probability model P2 is greatly narrowed. As such, the next selected sampling parameter having higher objective satisfaction score is more likely to fall into the possible satisfy region R1.

Then, in the step S140, the sampling risk evaluation unit 140 obtains another recommended sampling parameter (e.g., the sampling parameter X8) according to the objective satisfaction score model E2. Further, in the step S150, the sampling risk evaluation unit 140 estimates the constraint satisfaction probability (e.g., the constraint satisfaction probability P(X8)) according to the recommended sampling parameter (e.g., the sampling parameter X8) and the constraint satisfaction probability model P2. As shown in the FIG. 12, the constraint satisfaction probability P(X8) of the sampling parameter X8 is 0.76.

TABLE VII

| sampling parameter | objective function outputting value | constraint function outputting value (condition value g0 = −200) | objective satisfaction score | constraint satisfaction probability |
|---|---|---|---|---|
| X1 = −3 | f(X1) = 143.9 | g(X1) = 230 | | |
| X2 = 2.5 | f(X2) = 195.1 | g(X2) = −190 | | |
| X3 = 5.5 | f(X3) = 68.6 | g(X3) = −420 | | |
| X4 = 5.45 | | | E(X4) = 80 | P(X4) = 0.21 |
| X5 = 5.05 | | | E(X5) = 75 | P(X5) = 0.225 |
| X6 = 4.9 | | | E(X6) = 72 | P(X6) = 0.251 |
| X7 = 3.9 | f(X7) = 73.9 | g(X7) = −550 | | P(X7) = 0.51 |
| X8 = 2.9 | | | | P(X8) = 0.76 |

Next, in the step S160, the sampling risk evaluation unit 140 determines the relationship among the constraint satisfaction probability of the recommended sampling parameter (e.g., the constraint satisfaction probability P(X8) of the sampling parameter X8), the first predetermined value V1 and the second predetermined value V2. In this case, the constraint satisfaction probability P(X8) of the sampling parameter X8 is larger than the first predetermined value V1, and within the possible satisfy region R1. According to the table II, the sampling risk evaluation unit 140 will output the sampling parameter X8. So, the process proceeds to the step S180 to output the sampling parameter X8.

According to the embodiment, the optimum sampling search system 1000 combines the risk assessment mechanism and the probability model optimization technology to improve the search performance of sampling parameters, so as to achieve the industrial application requirements of reducing the number of trials and shortening the adjusting time.

The above embodiment is described with a single parameter model.

However, in another embodiment, the technology can be applied to a multi-parameter model.

Figure 13:
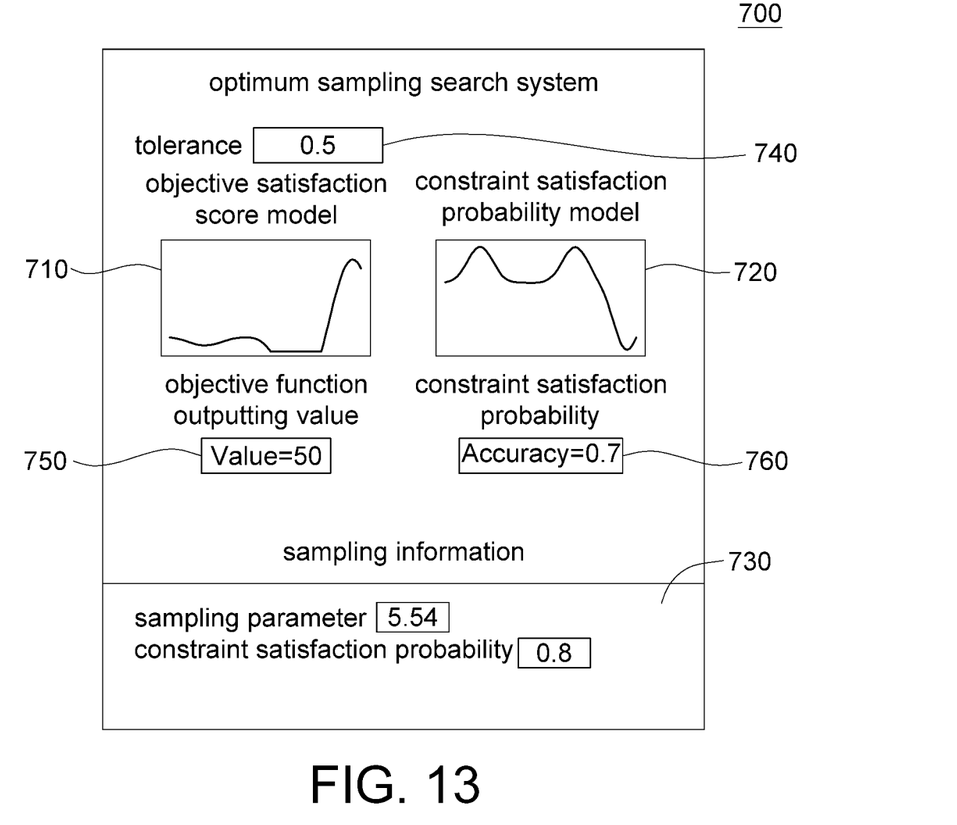
FIG. 13 shows a graphical user interface according to one embodiment.

The above technology can be installed on a mobile device or computer via an application (APP), and the searching process can be shown on the mobile device or computer. Please refer to FIG. 13, which shows a graphical user interface 700 according to one embodiment. The graphical user interface 700 includes an objective satisfaction score model window 710, a constraint satisfaction probability model window 720, a sampling information window 730, a tolerance setting window 740, a score window 750 and a probability window 760. The objective satisfaction score model window 710 is used for displaying the objective satisfaction score model, such as the objective satisfaction score model E1 or E2. The constraint satisfaction probability model window 720 is used for displaying the constraint satisfaction probability model, such as the constraint satisfaction probability model P1 or P2. The sampling information window 730 is used for displaying the recommended sampling parameter, such as the sampling parameter X7 or X8, and the constraint satisfaction probability, such as the constraint satisfaction probability P(X7) or P(X8). The tolerance setting window 740 is used for displaying the tolerance TR, the score window 750 is used for displaying the objective function outputting value of the recommended sampling parameter, the probability window 760 is used for displaying the constraint satisfaction probability of the recommended sampling parameter.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An optimum sampling search system with risk estimation, wherein the optimum sampling search system is used for obtaining a target process parameter of a thin film process or a target operating parameter of a chemical process and the optimum sampling search system comprises:
  a data acquisition unit, used for obtaining at least one objective function outputting value and at least one constraint function outputting value according to at least one executed sampling parameter corresponding the target process parameter or the target operating parameter, wherein the at least one executed sampling parameter includes at least one of RF energy, an amount of SiH4, an amount of NH3, an amount of chemicals added, a cooling water control condition and a circulating reflux ratio;
  an objective satisfaction score calculation circuit, used for obtaining an objective satisfaction score model according to the at least one executed sampling parameter and the at least one objective function outputting value;
  a constraint satisfaction probability calculation circuit, used for obtaining a constraint satisfaction probability model according to the at least one sampling parameter and the at least one constraint function outputting value;
  a sampling risk evaluation circuit, used for obtaining a recommended sampling parameter corresponding the target process parameter or the target operating parameter according to the objective satisfaction score model, wherein the recommended sampling parameter includes at least one of RF energy, an amount of SiH4, an amount of NH3, an amount of chemicals added, a cooling water control condition and a circulating reflux ratio; and used for estimating a constraint satisfaction probability of the recommended sampling parameter according to the recommended sampling parameter and the constraint satisfaction probability model; wherein if the constraint satisfaction probability of the recommended sampling parameter is larger than or equal to a first predetermined value, the recommended sampling parameter is outputted for being the target process parameter or the target operating parameter; and an adjusting circuit, wherein if the constraint satisfaction probability of the recommended sampling parameter is between the first predetermined value and a second predetermined value, the adjusting circuit adjusts the recommended sampling parameter to optimize the constraint satisfaction probability model;

wherein the constraint function outputting value is a value satisfying a constraint of the target process parameter or the target operating parameter, and the constraint satisfaction probability is a probability that the recommended sampling parameter satisfies an unknown constraint.

2. The optimum sampling search system according to claim 1, wherein the objective satisfaction score calculation circuit obtains the objective satisfaction score model, via a Gaussian process (GP) and an Expected Improvement acquisition function (EI acquisition function), according to the at least one executed sampling parameter and the objective function outputting value.

3. The optimum sampling search system according to claim 1, wherein the constraint satisfaction probability calculation circuit obtains the constraint satisfaction probability model via a Support Vector Machine (SVM) algorithm.

4. The optimum sampling search system according to claim 1, wherein the sampling risk evaluation circuit sets the first predetermined value and the second predetermined value via a discretization algorithm.

5. The optimum sampling search system according to claim 1, wherein the sampling risk evaluation circuit sets the first predetermined value and the second predetermined value according to a tolerance, and a distance between the first predetermined value and the second predetermined value is the tolerance.

6. The optimum sampling search system according to claim 1, wherein the first predetermined value is larger than the second predetermined value.

7. The optimum sampling search system according to claim 1, wherein if the constraint satisfaction probability is larger than or equal to the first predetermined value, a sampling risk of the recommended sampling parameter is possible to satisfy; if the constraint satisfaction probability is between the first predetermined value and the second predetermined value, the sampling risk of the recommended sampling parameter is uncertain to satisfy; if the constraint satisfaction probability is less than or equal to the second predetermined value, the sampling risk of the recommended sampling parameter is impossible to satisfy.

8. The optimum sampling search system according to claim 1, wherein the adjusting circuit selects a sampling point, which is closest to a decision boundary, to be the recommended sampling parameter, via an Active Learning algorithm.

9. An optimum sampling search method with risk estimation, wherein the optimum sampling search method is used for obtaining a target process parameter of a thin film process or a target operating parameter of a chemical process and the optimum sampling search method comprises:

obtaining at least one objective function outputting value and at least one constraint function outputting value according to at least one executed sampling parameter corresponding the target process parameter or the target operating parameter, wherein the at least one executed sampling parameter includes at least one of RF energy, an amount of SiH4, an amount of NH3, an amount of chemicals added, a cooling water control condition and a circulating reflux ratio;

obtaining an objective satisfaction score model according to the at least one executed sampling parameter and the at least one objective function outputting value;

obtaining a constraint satisfaction probability model according to the at least one sampling parameter and the at least one constraint function outputting value;

obtaining a recommended sampling parameter corresponding the target process parameter or the target operating parameter according to the objective satisfaction score model, wherein the recommended sampling parameter includes at least one of RF energy, an amount of SiH4, an amount of NH3, an amount of chemicals added, a cooling water control condition and a circulating reflux ratio; estimating a constraint satisfaction probability of the recommended sampling parameter according to the recommended sampling parameter and the constraint satisfaction probability model;

outputting the recommended sampling parameter for being the target process parameter or the target operating parameter, if the constraint satisfaction probability of the recommended sampling parameter is larger than or equal to a first predetermined value; and adjusting the recommended sampling parameter to optimize the constraint satisfaction probability model, if the constraint satisfaction probability of the recommended sampling parameter is between the first predetermined value and a second predetermined value;

wherein the constraint function outputting value is a value satisfying a constraint of the target process parameter or the target operating parameter, and the constraint satisfaction probability is a probability that the recommended sampling parameter satisfies an unknown constraint.

10. The optimum sampling search method according to claim 9, wherein the in the step of obtaining the objective satisfaction score model, the objective satisfaction score model is obtained, via a Gaussian process (GP) and an Expected Improvement acquisition function (EI acquisition function), according to the at least one executed sampling parameter and the objective function outputting value.

11. The optimum sampling search method according to claim 9, wherein in the step of obtaining the constraint satisfaction probability model, the constraint satisfaction probability model is obtained via a Support Vector Machine (SVM) algorithm.

12. The optimum sampling search method according to claim 9, wherein the first predetermined value and the second predetermined value are set via a discretization algorithm.

13. The optimum sampling search method according to claim 9, wherein the first predetermined value and the second predetermined value are set according to a tolerance, and a distance between the first predetermined value and the second predetermined value is the tolerance.

14. The optimum sampling search method according to claim 9, wherein the first predetermined value is larger than the second predetermined value.

15. The optimum sampling search method according to claim 9, wherein if the constraint satisfaction probability is larger than or equal to the first predetermined value, a sampling risk of the recommended sampling parameter is possible to satisfy; if the constraint satisfaction probability is between the first predetermined value and the second predetermined value, the sampling risk of the recommended sampling parameter is uncertain to satisfy; if the constraint satisfaction probability is less than or equal to the second predetermined value, the sampling risk of the recommended sampling parameter is impossible to satisfy.

16. The optimum sampling search method according to claim 9, wherein in the step of adjusting the recommended sampling parameter to optimize the constraint satisfaction probability model, a sampling point, which is closest to a decision boundary, is selected to be the recommended sampling parameter, via an Active Learning algorithm.

17. A display, wherein the display is used for obtaining a target process parameter of a thin film process or a target operating parameter of a chemical process via a graphical user interface, and the graphical user interface comprises:
    an objective satisfaction score model window, used for displaying an objective satisfaction score model, wherein the objective satisfaction score model is obtained according to at least one executed sampling parameter corresponding the target process parameter or the target operating parameter and at least one objective function outputting value, wherein the at least one executed sampling parameter includes at least one of RF energy, an amount of SiH4, an amount of NH3, an amount of chemicals added, a cooling water control condition and a circulating reflux ratio;
    a constraint satisfaction probability model window, used for displaying a constraint satisfaction probability model, wherein the constraint satisfaction probability model is obtained according the at least one executed sampling parameter and at least one constraint function outputting value; and
    a sampling information window, used for displaying a recommended sampling parameter corresponding the target process parameter or the target operating parameter and a constraint satisfaction probability, wherein the recommended sampling parameter is obtained according to the objective satisfaction score model, the constraint satisfaction probability is obtained according to the recommended sampling parameter and the constraint satisfaction probability model, and the recommended sampling parameter includes at least one of RF energy, an amount of SiH4, an amount of NH3, an amount of chemicals added, a cooling water control condition and a circulating reflux ratio;
    wherein the constraint function outputting value is a value satisfying a constraint of the target process parameter or the target operating parameter, and the constraint satisfaction probability is a probability that the recommended sampling parameter satisfies an unknown constraint.

18. The graphical user interface according to claim 17, further comprising a tolerance setting window, used for setting a tolerance, wherein a first predetermined value and a second predetermined value are set according to a tolerance, and a distance between the first predetermined value and the second predetermined value is the tolerance.

* * * * *